Aug. 1, 1944.   M. S. LOPES, JR   2,354,920
MANUFACTURE OF CONTAINERS AND APPARATUS THEREFOR
Filed May 27, 1940   7 Sheets-Sheet 4
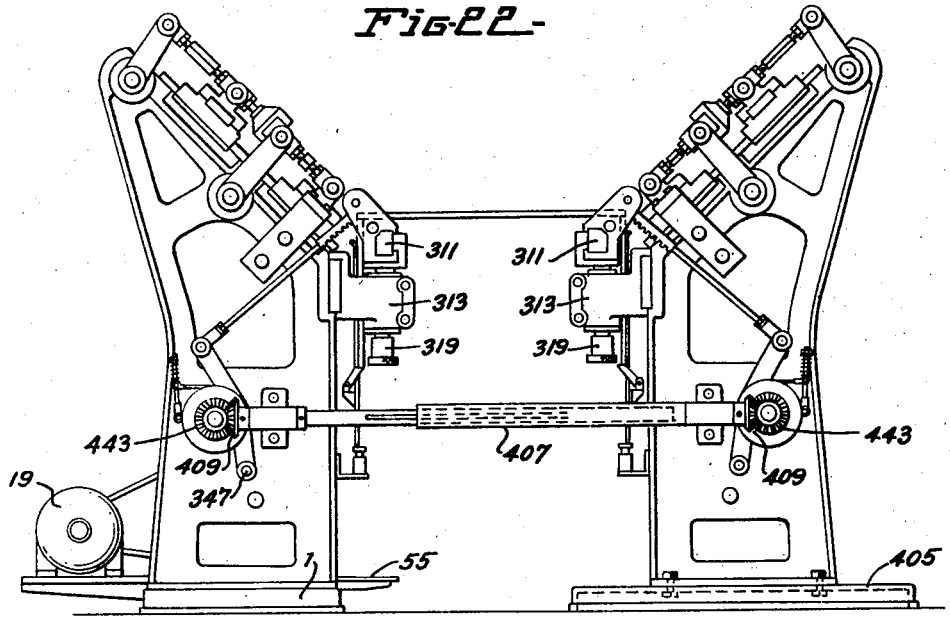
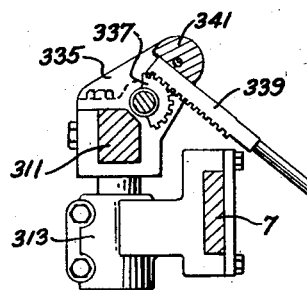
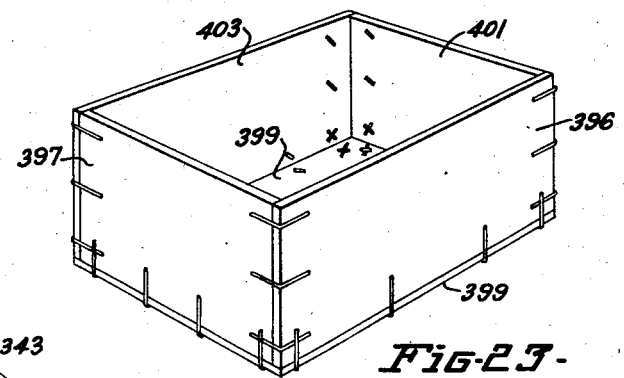
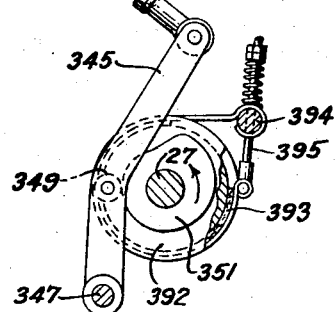
INVENTOR.
MANUEL S. LOPES JR.
BY Charles O. Bruce
ATTORNEY.

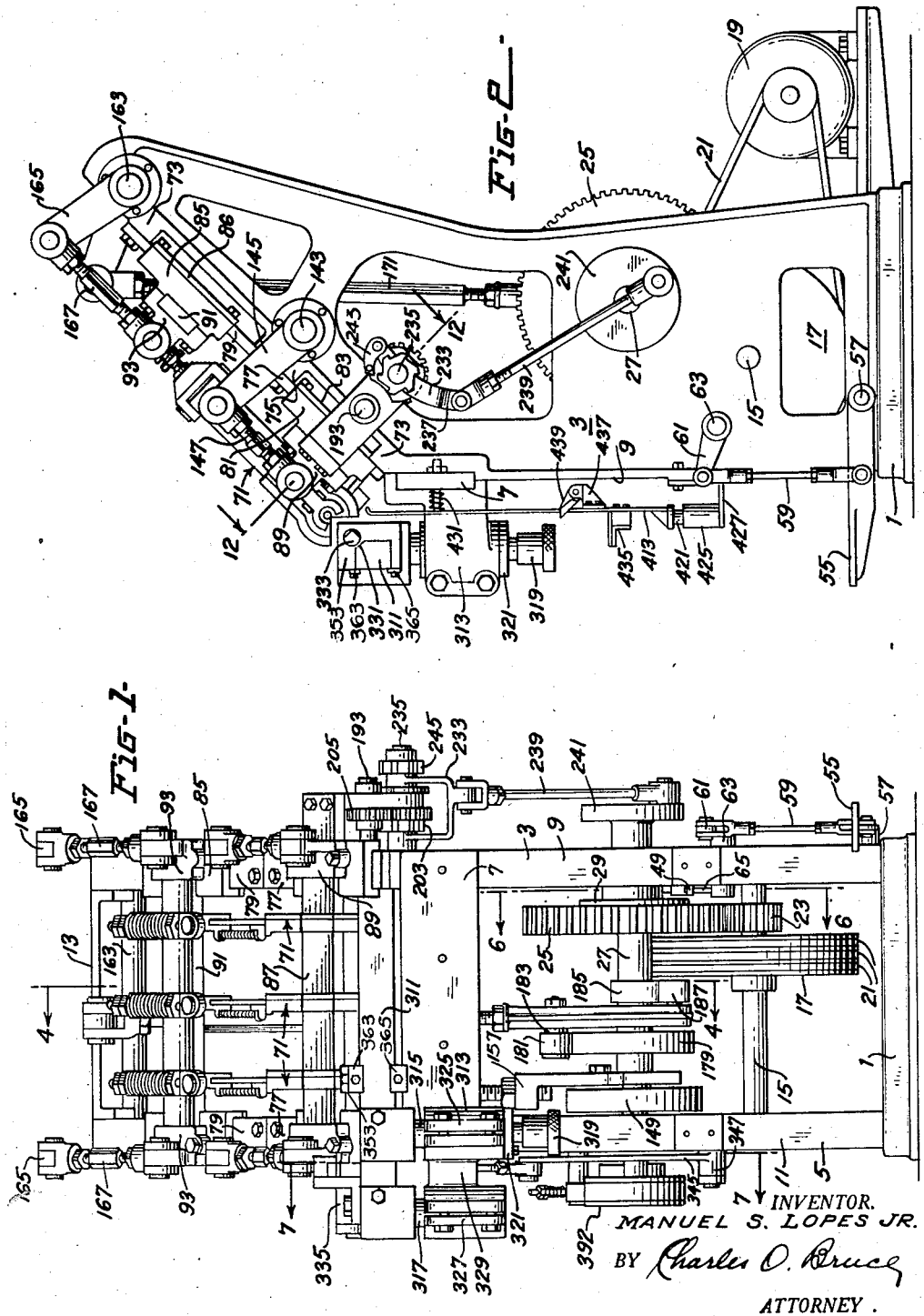

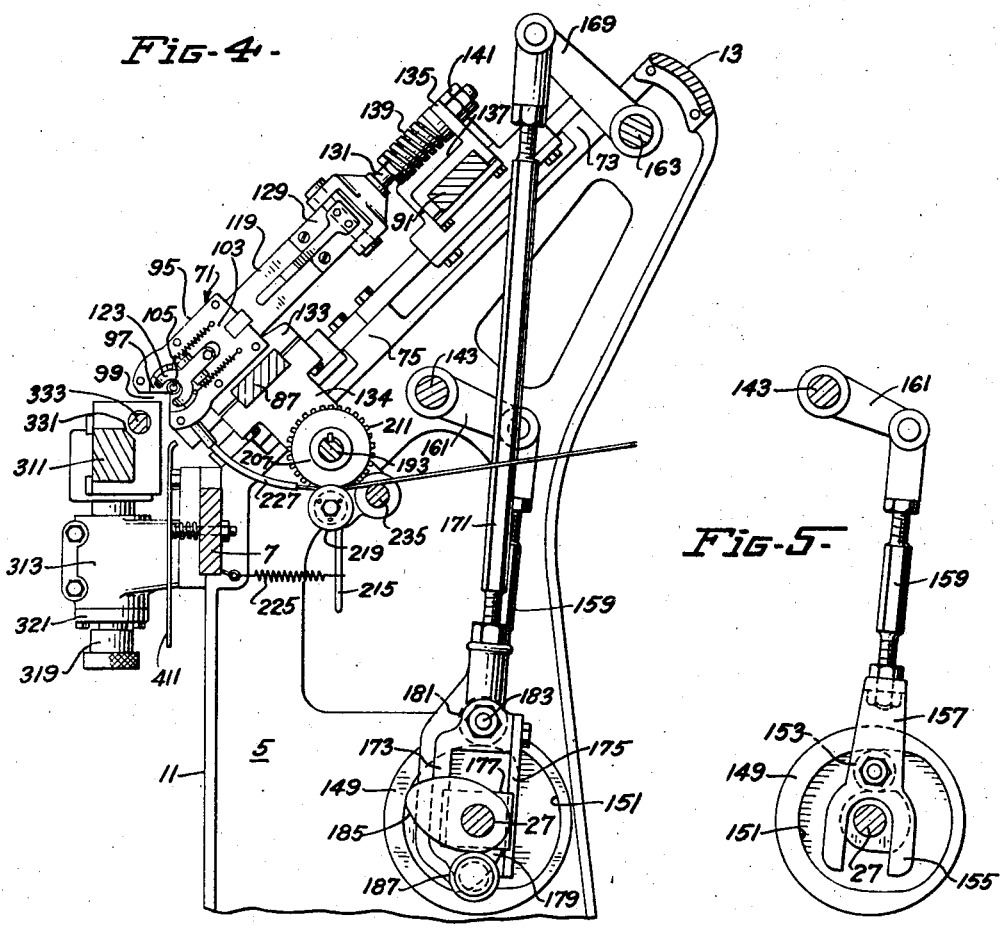

Aug. 1, 1944.    M. S. LOPES, JR    2,354,920
MANUFACTURE OF CONTAINERS AND APPARATUS THEREFOR
Filed May 27, 1940    7 Sheets-Sheet 5
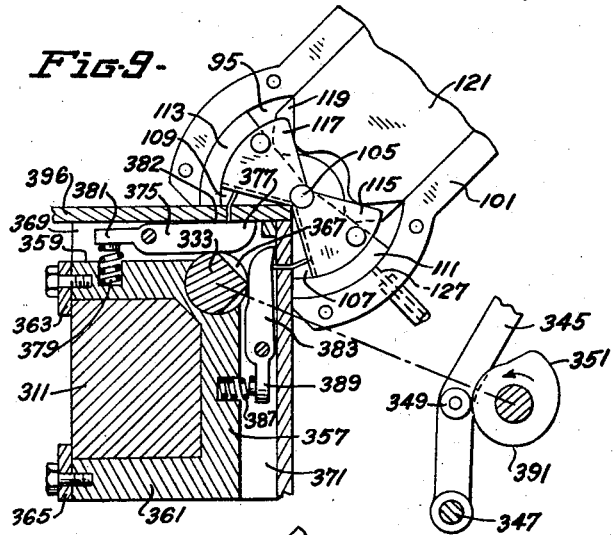
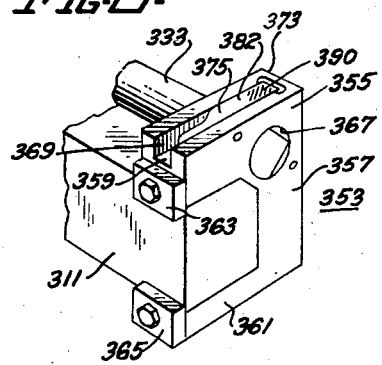
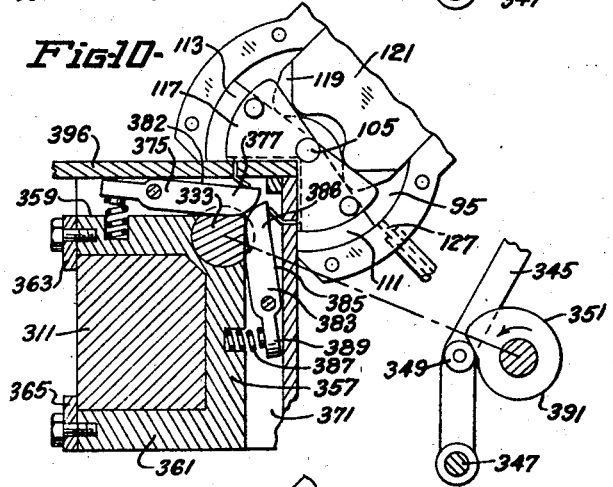
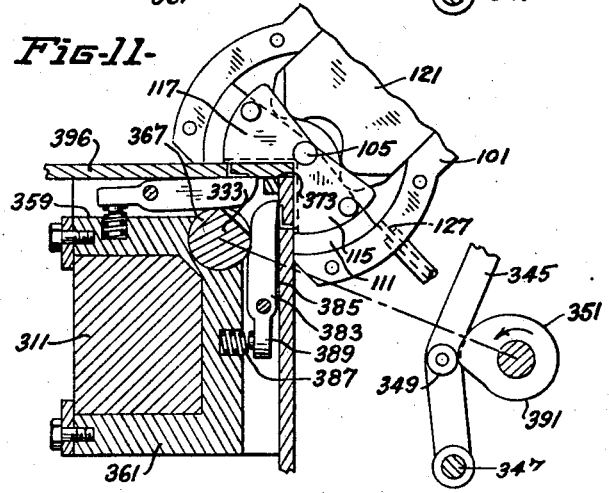
INVENTOR.
MANUEL S. LOPES JR.
BY Charles O. Bruce
ATTORNEY.

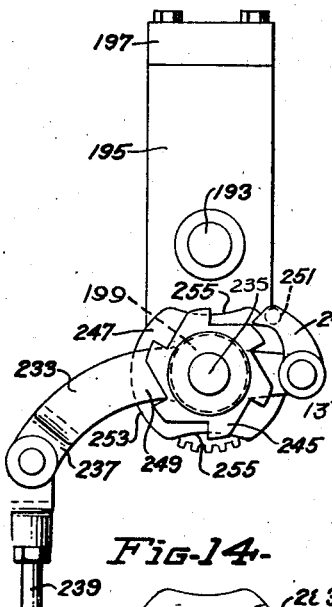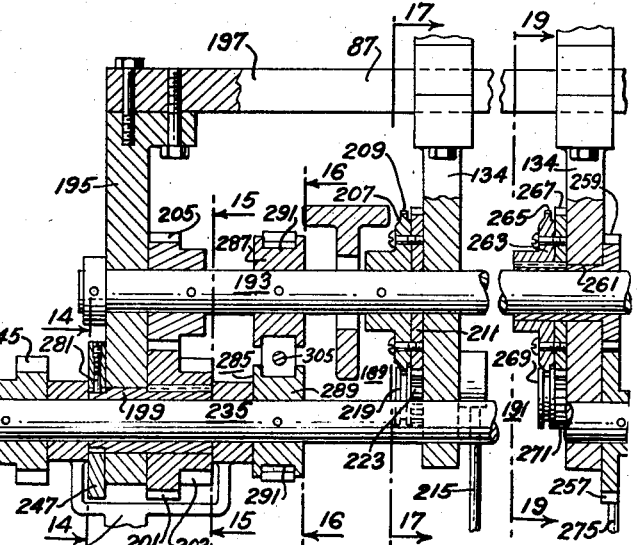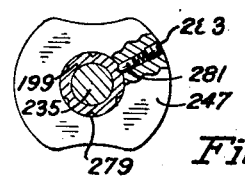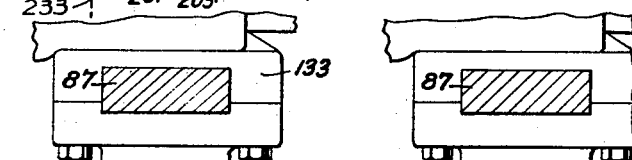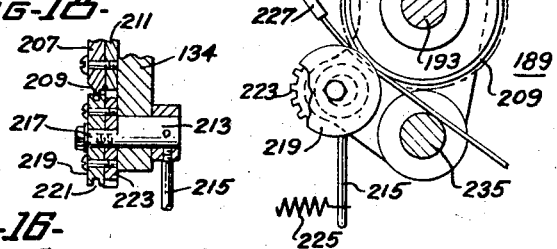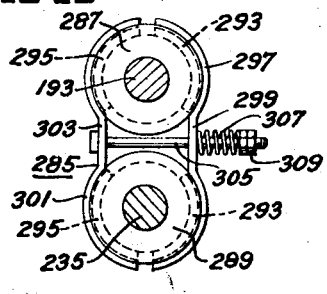

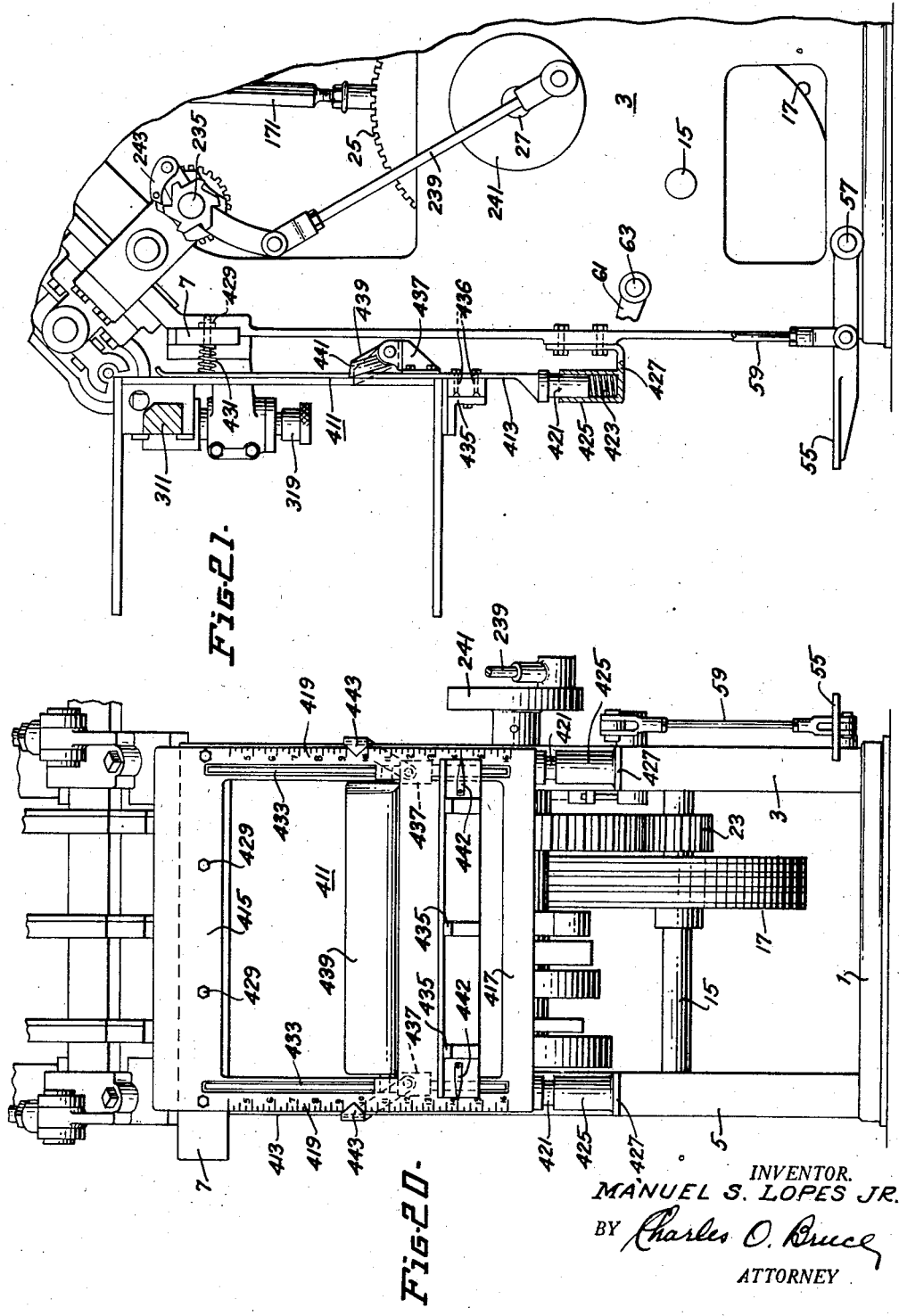

Patented Aug. 1, 1944

2,354,920

UNITED STATES PATENT OFFICE 2,354,920

MANUFACTURE OF CONTAINERS AND APPARATUS THEREFOR

Manuel S. Lopes, Jr., Alameda, Calif.

Application May 27, 1940, Serial No. 337,467

15 Claims. (Cl. 1—11)

My invention relates to the manufacture of containers, and more particularly to a stapling machine and method for assembling the components of a container.

The use of stiff, non-creasable material such as wood in the manufacture of boxes for the packaging and shipping of commodities has proven highly satisfactory from the viewpoint of assuring the safe arrival of such commodities, with a minimum of loss or damage. The inherent strength of wood and its resistance to abuse; its apparent immunity to dampness and moisture; its natural porosity, enabling evaporation of condensation from within the container, are characteristics which have contributed toward its satisfactory use in shipping containers. The weight of such a container, however, has always been a restraining factor to its use, in view of the freight costs which the utilization of wooden boxes entailed. Consequently, upon the development of less costly substitute containers of inherently lighter weight, such as those made of fiberboard, corrugated cardboard, or the like, great inroads have been made into the wood box industry, and this, in spite of the fact that these substitute containers are known to be decidedly less satisfactory for the purpose in many instances, because they cannot stand up when exposed to moisture, they permit damage to contents without outward evidence of the fact, and they cause rusting of metallic contents, due to the fact that condensation occurring within the container has no access to the atmosphere, the container material usually being of a non-porous character.

Among the objects of my invention are to provide an improved method of assembling the components of a container, which will enable the use of thin sheets of wood material, commonly designated in the industry as "shook," or similar material, and yet incorporate the desirable advantages of the nailed wood box, thus placing it on a competitive basis with containers fabricated from fiberboard or corrugated cardboard; to provide an improved method of fabricating a wood box, enabling the box to have less weight and considerably greater strength than a nailed wood box of corresponding internal dimensions; to provide an improved machine of the stapling type for fabricating boxes; to provide an improved machine of the stapling type for fabricating boxes of thin sheet material which is inherently stiff and non-creasable; to provide an improved machine of the stapling type, enabling rapid assembly of boxes from thin sheet material, such as "shook"; to provide an improved machine of the stapling type, capable of stapling a complete edge of a box in one stapling operation; to provide an improved machine of the stapling type for stapling successive edges of a container in as many stapling operations, while automatically accommodating itself to edges of different lengths in the proper sequence of assembling the container components; to provide an improved stapling machine for driving corner staples with a high degree of uniformity; to provide an improved stapling machine for producing tightly stapled corners; to provide an improved stapling machine capable of corner stapling two angularly disposed walls of different thicknesses; to provide an improved stapling machine for the manufacture of boxes, in which the machine can be pre-adjusted to automatically accommodate itself to the varying dimensions of the box under construction; and to provide an improved stapling machine assembly involving a plurality of unit machines, capable of simultaneous operation, for stapling two edges of a box under construction in one operation.

Additional objects of my invention will be pointed out in the following description of the same taken in conjunction with the accompanying drawings wherein—

Figure 1 is a front elevational view of my improved stapling machine.

Figure 2 is a side elevational view of the same machine.

Figure 4 is a view, in section, along the line 4—4 of Figure 1.

Figure 5 is an elevational view of a cam controlled lever assembly for assisting in the shifting of the stapling head assemblies into engagement with the work to be stapled.

Figure 6 is a view, in section, along the line 6—6 of Figure 1, showing a foot operated power control for the machine.

Figure 7 is a view, in section, along the line 7—7 of Figure 1, showing the anvil cam bar control.

Figure 8 is a view, in perspective, of an anvil assembly.

Figures 9, 10 and 11 are views, in section, through the anvil assembly, showing the same in association with a stapling head, to illustrate the timing in the operation of these components, and also including associated sketches of the cam control of Figure 7, showing its position for each of the timing operations depicted in these figures.

Figure 12 is a fragmentary view, in section, along the line 12—12 of Figure 2.

Figure 13 is an end elevational view in the direction of arrow 13 of Figure 12, showing the pawl and ratchet control of certain of the stapling head feed assemblies.

Figure 14 is a view along the line 14—14 of Figure 12, depicting the sequence determining cam of my improved machine, the cam being partly broken away, showing the construction permitting manual adjustment of the cam about its supporting shaft.

Figure 15 is a view, in section, along the line 15—15 of Figure 12, showing, in elevation, another pawl and ratchet control for the remaining stapling head feed assemblies.

Figure 16 is a view, in section, along the line 16—16 of Figure 12, showing, in elevation, a brake assembly to prevent overrunning of any of the stapling head feed assemblies.

Figure 17 is a view, in section, along the line 17—17 of Figure 12, showing, in elevation, a feeding assembly associated with certain of the stapling heads.

Figure 18 is a view, in section, through a fragment of the feeding assembly of Figure 17.

Figure 19 is a view, in section, along the line 19—19 of Figure 12, showing, in elevation, another stapling head feed assembly associated with others of the stapling heads.

Figure 20 is a front elevational view of the work holder of the machine, showing mechanism for adjusting and automatically accommodating the holder to the different dimensions of a container, in the proper sequence of assembling the container components.

Figure 21 is a side elevational view of the work holder of Figure 20.

Figure 22 is an end elevational view, depicting a double stapling head machine assembly, operating from a single power control, for simultaneously stapling different edges of a box under construction, and showing the adjustment for accommodating the assembly to the fabrication of boxes of different sizes.

Figure 23 is a view, in perspective, of a box assembled in accordance with my improved method as carried out by my improved stapling machine.

Figure 3:
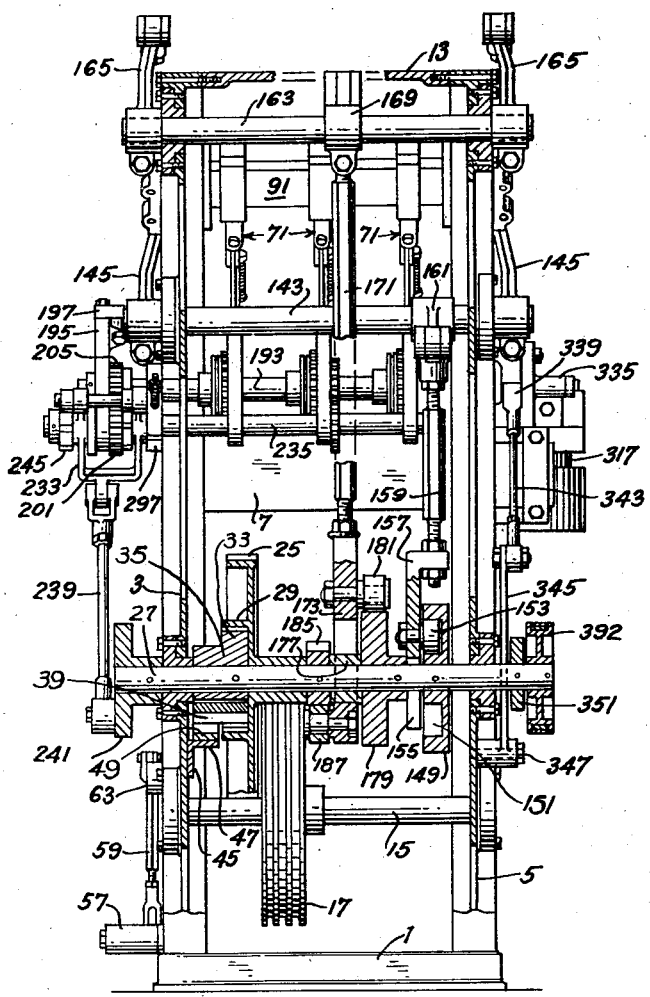
Figure 3 is a rear elevational view.

In its broadest aspect, my improved method involves the fabrication of boxes from material which is stiff and non-creasable, such as wood, by stapling the adjacent wall components together along their contacting edges, with resilient staples, causing the staples to enter the wall material substantially normal to the wall surfaces, and clinching the exposed ends against the inner surfaces of such walls and preferably at an angle across the grain thereof. This method of fabricating boxes results in a box having considerable resiliency and shock-absorbing qualities, in spite of the relatively stiff character of the material from which the box is fabricated, such resiliency being concentrated for the most part along the box edges, where a box normally is exposed to greatest abuse. As an added feature of my improved method, the staples at the 'three wall" corners of the container are caused to overlap or interlock one with another, thus greatly strengthening the box at such points.

The machine for carrying out my improved method involves a plurality of stapling heads and associated anvils, all designed to operate simultaneously for stapling a complete edge of a box in one operation. In as much as the edges of a box usually differ as to length in accordance with the dimensions of the box, the machine is designed so that it may be pre-adjusted to accommodate itself automatically to the stapling of successive edges of differing lengths, in accordance with the natural sequence followed by an operator in assembling the components of the box for stapling.

The machine is designed to staple at an angle to the horizontal, of the order of 45°, which not only facilitates adjustment of the machine to adapt the machine for fabrication of boxes of material such as shook, of different thicknesses, and boxes where the end walls may be of different thickness than the side walls, but also enables cooperative operation of two machines, as an assembly, from a common power source, whereby two edges of a box may be stapled simultaneously and in one stroke of the machine assembly.

The machine embodies numerous mechanical features and refinements in addition to the broad features pointed out above, and these will be stressed along with the broader features of my invention in the detailed description of the same which follows.

The machine is built upon a frame, comprising a base 1 and a pair of parallel disposed side frame members 3 and 5, the upper edges of which slope on an angle with the horizontal, of the order of 45°. The side frame members are rigidly supported in their parallel relationship by a flat bar connector 7 extending across the front of the machine and bolted to the front edges 9 and 11 of the side frame members 3 and 5 respectively, and a cross bar 13 extending between the side frame members and bolted to each one at the topmost point thereof. This arrangement provides an exceedingly rigid construction, capable of withstanding the various strains and stresses imposed upon the machine frame by the operation of the machine components supported thereby.

Extending between the side frame members, and journaled therein, is a power shaft 15, to which is affixed, at an intermediate point between the side frame members, a pulley 17. The peripheral surface of this pulley is V-grooved to effect driving connection from a motor 19 by means of a plurality of V-belts 21. Adjacent the pulley 17, and affixed to the power shaft 15, is a pinion 23 which meshes with a freerunning gear 25 mounted on the main drive shaft 27 of the machine. This drive shaft 27 is supported by the side frame members, and extends beyond each of said side frame members for a short distance.

The freerunning drive shaft gear 25 is formed with a laterally extending circular flange 29. About the internal periphery of this laterally extending circular flange, there is provided a plurality of V-notches 31, transversely thereof, to form a ratchet. The laterally extending circular flange 29 encircles a collar 33 which is pinned to the main drive shaft 27 and is formed with a reduced section 35 extending laterally therefrom. A segment of this collar is removed to provide space 37 for pivotally affixing a pawl 39, which is normally adapted to drop into engagement with any of the V-notches 31 of the interior ratchet surface of the circular flange. Such engagement is made more positive by the application of a compression spring 41 between the pawl 39 and a wall 43 of the cylindrical element formed by the removal of the aforementioned segment. This pawl extends axially for substantially the longitudinal dimension of the collar 33, including its reduced lateral extension 35. With the pawl in engagement with the ratchet surface formed within the circular flange, it will be apparent that the freerunning gear 25 effectively becomes fixed to the main drive shaft 27, and will take power from the pinion 23 on the power shaft 15, and transmit the same to the main drive shaft. It is from this main drive shaft 27 that all the components of the machine derive their operating power.

To control the transmission of power from the power shaft to the main drive shaft, and thereby control operation of the machine as and when desired, I provide a foot control mechanism, which will, in the absence of pressure on the foot control, hold the pawl 39 out of engagement with the ratchet surface, and in response to foot pressure upon the foot treadle, permit the pawl to effect such engagement, and thus bring about operation of the machine. To accomplish this control, I mount a shelf bracket 45 upon the inner surface of the side frame member 3, adjacent the pawl and ratchet elements 39 and 29 respectively, with the shelf portion 47 of the bracket extending below the lateral extension 35 of the collar 33. On this shelf bracket, I provide a slide bar 49, having slots 51. A portion of this slide bar extends beyond the end of the bracket, toward the front of the machine. This slide bar is loosely bolted to the shelf bracket 45 through slots 51 provided therein, thus enabling sliding movement of the slide bar within the limits permitted by the slots.

From the upper surface of this slide bar, there extends a flat surfaced boss 53, at an intermediate point, such that, with the slide bar at its rearwardmost position, the boss will lie beneath the pawl 39 and hold the same out of engagement with the V-shaped notches of the ratchet 29. The forward movement of the slide bar, permitted by the slots therein, is sufficient to carry the boss away from the pawl, permitting the pawl to drop into engagement with the first notch that approaches in line with the pawl as a result of the continual rotation of the freerunning gear 25.

The starting and stopping position of the slide bar 49 is under the control of a foot treadle 55, pivotally anchored to a stub shaft 57 on the outside surface of the side frame member 3 and extending toward and beyond the front of the machine, in position for engagement by an operator. An adjustable arm 59 connects this treadle, at an intermediate point thereon, to the extremity of a crank lever 61 which is fixed to a short shaft 63 extending through and journaled in the side frame member 3 at a distance above the treadle 55. The end of this short shaft, where it emerges from the inner surface of the side frame member 3, carries a short lever 65 whose end extends into a perforation or opening 67 formed in the extended end of the slide bar member 49, thus permitting a free pivotal movement of this end of the lever within the slide bar member. A spring 69, anchored to the shelf bracket 45 and engaging this lever 65, serves to normally bias the foot control mechanism to a position determining the rearwardmost position of the slide bar 49, where the boss 53 will engage the pawl 39 and hold it out of engagement with its associated ratchet 29.

From the description of this foot control mechanism for starting and stopping the machine, it will be apparent that the application of foot pressure to the treadle 55 will be instrumental in sliding the slide bar 49 to its forward position, causing the boss 53 to be withdrawn from the path of movement of the pawl 39, and enable the same to effect engagement with the ratchet 29, for setting the main drive shaft 27 in rotation. Upon removal of the foot pressure, the slide bar will immediately return to its former position, and, if such removal of pressure is effected before a complete revolution of the pawl with its ratchet, the boss will return in time to effect disengagement of the pawl at the termination of one complete revolution, and in a stapling machine of the type under description, such is the manner in which it is normally operated when put to use. As previously indicated, it is from this main drive shaft that all the working assemblies carried by the frame are driven.

The sloping upper edges of the side frame members 3 and 5 carry a gang of aligned stapling heads 71, which, during each operation of the machine, are bodily moved from their rest position to the work to be stapled, following which, the stapling heads are caused to operate in the forming and driving home of the staples at the proper points in the work, and are then restored to their former rest positions. To accomplish this movement, the sloping upper edge of each side frame member is provided with a boss 73 at each end thereof, and one 75 at an intermediate point, but closer to the lower end boss than to the upper end boss. Bolted to the bosses of each side frame member, are slide rails, one 77 extending between the lower end boss 73 and the intermediate boss 75, and the other 79 extending from the intermediate boss 75 to the upper end boss 73, although, in lieu of two aligned rails such as just described, a single continuous rail might be utilized.

Each rail 77 carries a saddle 81 which is slidably bolted thereon by means of a plate 83 extending beneath the rail and bolted to the saddle. Similarly, each rail 79 carries a saddle 85 slidably maintained thereon by a plate 86 bolted thereto. Thus, each of the side frame members 3 and 5 carries two such saddles 81 and 85 in alignment with the corresponding saddles on the opposing side frame member. A cross bar 87 extends across the upper edges of the side frame members 3 and 5 and rests within the lower oppositely disposed saddles 81, to which it is bolted at each end by a yoke 89 associated with each saddle. A similar cross bar 91 is carried by the two upper oppositely disposed saddles 85 and is bolted thereto by means of similar yokes 93.

The stapling heads 71 are supported on these cross bars 87 and 91 at desired points intermediate the rail supports for such bars. The particular location of the stapling heads, and the number of the same, depends upon the character of the work to be accomplished by the machine, for example, the number of staples to be driven into the work upon each stroke of the machine, and the relative positioning of such staples.

The stapling head, employable with my machine, may be any one of many types known to the prior art, but the particular one which I have shown is very well adapted for use in my improved machine and presents advantages when so used. This stapling head constitutes the subject matter of my co-pending application for Stapling head, Serial No. 266,555, filed April 7, 1939. For a complete understanding of my improved stapling machine and method of assembling containers, it is not necessary to go into the construction of this stapling head, except in a more general way to bring out its advantages when employed as part of my improved machine, and, further, to provide a basis for the specific drive mechanism embodied in the machine, to effect operation of this stapling head.

Accordingly, the stapling head of my aforementioned application comprises a back plate 95 of rectangular form in part, terminating at one end in a section 97 substantially circular in shape. This portion has formed therein a V-notch 99 and constitutes the stapling end of the stapling head, since this notch enables the stapling head to engage the adjacent corner components of a box under construction, for stapling purposes. This back plate is bordered, along its sides and curved portions, by a bounding wall 101, to which is applied a cover plate 103 extending from the rectangular end of the back plate, and terminating short of the apex of the V-notch. The back plate carries a short shaft 105 at the apex of the V-notch, which position of the shaft coincides with the center of curvature of the circular portion of the back plate.

A pair of formers 107 and 109, lying in a common plane and constituting segments of a circle, are pivoted to this short shaft. These formers lie adjacent the back plate 95, and each is provided with an arcuate wall 111 and 113 respectively, along its edge, which is adapted to slide along the inner surface of that portion of the bounding wall 101 associated with the circular portion of the back plate, upon rotation of the formers about their pivot shaft 105. Superposed upon the formers 107 and 109, and also pivoted to the same shaft 105, are a pair of hammer elements 115 and 117 respectively, each constituting a segment of a circle of a radius enabling the arcuate edge of each hammer to slide along the inner surface of the wall 111 or 113, whichever one it may be associated with.

The back plate and cover plate assembly provide a guide channel for receiving a pair of adjacently positioned driving members 119 and 121. Each of these driving members has a scalloped engaging end. One of these driving members 119 is adapted, upon movement, to engage and rotate the formers through an angle, bringing them into contact against the work to be stapled. The other driving member 121 is adapted to follow up and engage the hammer elements to rotate them through an angle, bringing them into engagement with the work to be stapled. The formers, during their movement, cooperate with a stapling head anvil 123 to form the staple, following which, and before movement of the hammers is initiated, the anvil automatically is caused to swing out of the path of the hammers and permit the free movement thereof against the staple which has just previously been formed, driving the same through the work. During the driving operation by the hammers, the formers remain in engagement with the work, thus tending to hold the work steady while the staples are being driven home by the hammers.

The staple forming material is in the form of wire wound on a suitable reel (not shown), the wire being threaded through an opening 127 in the arcuate portion of one side wall 101 of the stapling head and directed across to the opposing arcuate wall portion just below the normal position of the formers 107 and 109, from which it will be noted that movement of the formers will necessarily cause the former 107 to sever that portion of the wire extending between the arcuate wall portions, and bend the same about the anvil 123 which is temporarily swung into position below the severed section of wire and between the paths of movement of the arcuate end walls 111 and 113 of the formers. The driving members 119 and 121 for the formers and hammers are actuated in the proper manner through a driving head 129 which is pivotally connected to a stapling head supporting stem 131.

The entire stapling head assembly is supported edgewise upon the two cross bars 87 and 91. The stapling end is provided with a mounting bracket in the form of a yoke 133 adapted to span the cross bar 87 to which it is clamped by bolting the yoke to a depending bracket 134 straddling the underside of the cross bar. The stem 131 of the stapling head extends through a flange 135 of a yoke 137 adapted to straddle and be bolted to the upper cross bar 91, thus providing support for the stem end of the stapling head. A stiff shock-absorbing spring 139 is placed about the stem 131, between the driving head pivotal connection and the supporting flange 135, and the stem is precluded from withdrawing from the flange during stapling operations by suitable nuts 141 applied to the protruding end of the stem.

In order to carry out proper movements of the stapling head to realize proper stapling, the entire stapling head 71, as was previously pointed out, must be moved bodily into engagement with the work to be stapled, following which the driving means 119 and 121 for the formers and the hammers must be actuated, and such actuation must come from the upper cross bar 91 acting through the stem 131 of the stapling head. Both cross bars 87 and 91 must consequently slide simultaneously downwardly on these rails 77 and 79 until the stapling head assembly has arrived in stapling position. The lower cross bar 87 must then be brought to a halt, while the upper cross bar 91 is permitted to continue its downward movement sufficiently to bring about the proper actuation of the driving means 119 and 121 in the stapling head, and, consequently, proper operation of the formers and the hammers of the stapling head. To realize such movement, the lower cross bar and the upper cross bar are provided with individual drive mechanisms designed to bring about the initial equal and simultaneous movements of the cross bars, followed by the necessary continued advancement of the upper cross bar after movement of the lower cross bar has been brought to a stop.

The individual drive for the lower cross bar 87 involves an auxiliary drive shaft 143 extending through and slightly beyond both side frame members 3 and 5 in which the shaft is journaled. At each extended end of this auxiliary drive shaft, there is mounted a lever 145 which is pivotally connected to one end of an adjustable rod assembly 147, the other end of which rod assembly is pivotally connected to the yoke 89 that straddles the lower cross bar 87 and serves to hold the same in position. Rotation of this auxiliary drive shaft 143, through a suitable angle, will thereby tend to urge the lower cross bar in a downward direction toward the work to be stapled.

Such angular rotation of the auxiliary drive shaft is obtained through a cam controlled crank connection from the main drive shaft 27 to the auxiliary drive shaft 143. This involves a cam 149 fixed to the main drive shaft, and having a cam groove 151 in one face thereof to receive a cam follower 153. This cam follower is fixed to the side of a fork 155 which spans the main drive shaft 27 and which is connected at its shank 157, through an adjustable rod assembly 159, to one end of a crank 161. This crank in turn is fixed to the auxiliary drive shaft 143. The cam groove pattern is such that the initial portion of the crank movement will cause a uniform downward sliding of the lower cross bar 87 to its lower stop position, at which point the cam follower 153 rides in a portion of the cam groove 151, which precludes further movement of the lower cross bar until completion of operation of the stapling head, all of which occurs well within the period of one revolution of the main drive shaft. During the remaining portion of the prevailing revolution of the main drive shaft, the lower cross bar will be restored to its former position.

A somewhat similar drive connection is provided for imparting to the upper cross bar its necessary movement previously described.

An auxiliary drive shaft 163 is supported by the side frame members 3 and 5, adjacent the upper ends thereof. This auxiliary drive shaft protrudes sufficiently beyond each of the side members to mount thereon at each end a lever 165 which is pivotally connected to one end of an adjustable rod assembly 167, the other end of which is pivotally connected to the yoke 93 which straddles the upper cross bar 91.

The necessary angular movement of levers 165 and the auxiliary drive shaft 163 on which they are mounted, is imparted thereto from a cam controlled crank connection driven from the main drive shaft 27 and connecting to the auxiliary drive shaft 163. This interconnection includes a crank 169 fixed to the auxiliary drive shaft 163 at an intermediate point thereon, the end of the crank being pivotally connected to an adjustable rod assembly 171, which terminates in a U-shaped head 173. This head encloses the main drive shaft 27 and is spanned by a closing member 175 to form an internal guideway for movement upon a guideblock 177 which is freely mounted on the main drive shaft.

A cam 179 fixedly mounted on the main drive shaft, adjacent one side of the head 173, is engaged by a cam follower 181 mounted on a stub shaft 183 supported at one end of the head, adjacent its connection to the adjustable rod assembly 171. This cam constitutes the elevating cam and serves to lift the drive connection to the auxiliary drive shaft 163 through its engagement with the cam follower 181.

Adjacent the other side of the head 173 and fixed for rotation with the main drive shaft 27, is another cam 185, and this cam cooperates with an independent cam follower 187 mounted at the other end of the head, which would be at a point below the main drive shaft. Consequently, this last mentioned cam 185 will function to lower the drive connection through cooperation with its associated cam follower 187. The cams 179 and 185 are so designed and disposed with respect to each other that they cooperate to raise and lower the associated drive connection in proper sequence, and the cam patterns are such that the lowering cam 185 will cause the upper cross bar 91 to be lowered in unison with the lowering of the lower cross bar, until the lower cross bar is brought to a stop, and then continue such movement of the upper cross bar to effect operation of the stapling heads mounted on the cross bars, after which the elevating cam 179 will operate to restore the upper cross bar 91 to its rest position. The actual stapling operation occurs, therefore, during an intermediate portion of the revolution of the main drive shaft 27.

The number of stapling heads supported upon the cross bars 87 and 91 will vary in accordance with the character of the work to be accomplished, and will, accordingly, equal in number the maximum number of staples which it is desired to drive home in any single operation in the manufacture or fabrication of a particular box. In as much as all of such stapling heads will not be used in stapling other sides of a container of shorter dimensions, it becomes necessary to control the operation of these stapling heads in accordance with a predetermined sequential grouping, and such sequential grouping is accomplished in the present machine by controlling the feed of the stapling wire to the stapling heads in proper timing. This is accomplished in a general way by feeding the stapling wire to certain of the stapling heads in preparation for each stroke thereof, while interrupting the feed of stapling wire to others of the stapling heads in accordance with such times when such stapling heads are not utilized in the stapling of certain sides of a container. The specific mechanism for accomplishing the sequential grouping along these lines is illustrated in detail in Figures 12 to 19 inclusive, of the drawings, to which reference will now be made.

Each of the brackets 134 serves to carry a portion of the feed mechanism for a stapling head. Two of such feed mechanisms 189 and 191 are disclosed in Figure 12 of the drawings, one of which 189 is representative of the feed mechanism associated with each of those stapling heads that are intended to operate at each stroke of the machine, while the other feed mechanism 191 is representative of those which are associated with each of the stapling heads that are intended to be added in stapling a longer dimension of the container under construction.

A feed control drive shaft 193 is supported in these brackets, and has one end journaled in a bracket arm 195 bolted to an extension 197 of the lower cross bar 87, and depending therefrom in the same direction as the feed mechanism supporting brackets 134. At a lower point in this bracket arm, there is journaled a short hollow shaft 199. This hollow shaft has keyed thereto against the inner surface of the bracket arm 195, a pinion 201 having an integral ratchet 203 laterally extending therefrom along the hollow shaft. This pinion 201 engages a pinion 205 fixed to the feed control drive shaft 193, whereby rotation of the first pinion 201 will result in rotation of the feed control drive shaft 193.

The feed mechanism 189, part of which is carried by the feed control drive shaft 193, comprises a feed wheel 207 having a reduced knurled rim 209. This feed wheel is fixed to the feed control drive shaft in line with the feed opening 127 of the stapling head mounted above on the cross bars 87 and 91. Bolted to this wheel, between it and the bracket, is a gear 211. Through the lower end of the feed mechanism supporting bracket 134, there is journaled a shaft 213, to one end of which is connected a depending handle 215. The other end of the shaft terminates in a reduced offset end 217 to form an eccentric, and on this offset end there is rotatably mounted a rim engaging feed roller 219 having a grooved periphery 221 for engagement with the knurled rim 209 of the feed wheel 207. To this rim engaging roller is attached a pinion 223 which is maintained in engagement with the gear 211 associated with the feed wheel 207. The eccentric mounting of the rim engaging roller 219 and pinion 223 enables the temporary separation of the roller 219 from engagement with the feed wheel 207 by manipulation of the handle 215, to permit threading therebetween of the staple feed wire from a suitable spool (not shown), after which, the handle 215 might be urged to its former position to clamp the stapling wire in tight frictional engagement between the feed wheel and its associated roller. The handle 216 is biased to this engaging position by a spring 225, one end of which engages the handle, while its other end is connected or attached to some fixed part of the machine, such as the front cross bar 7, or some other suitable point on the frame of the machine.

From the description of this feed mechanism, it will be apparent that any rotational movement of the feed control drive shaft 193 will bring about, not only a positive rotational movement of the feed wheel 207, but also, by reason of the gear 211 and pinion 223 drive, a positive rotational movement of the rim engaging roller 219 in the proper direction, to secure positive feed of the stapling wire, without slippage. The wire, as it is fed between the feed wheel and engaging roller, enters a guide tube 227 which guides it into the feed opening 127 of the associated stapling head.

The amount of wire fed to a stapling head for the formation of a staple is determined by the angle of rotation imparted to the feed control drive shaft 193 for each stroke of the machine. This is governed by the design of the ratchet 203 and the throw or travel of its associated pawl. A pawl 229, for cooperation with this ratchet, is pivotally mounted on one extended prong 231 of a yoke 233 which, in turn, is mounted for angular rotation upon a shaft 235, one end of which extends through and is journaled in the hollow shaft 199. The aforementioned yoke spans the hollow shaft and terminates in a shank or stem 237 which is pivotally connected to one end of an adjustable rod assembly 239; the other end of which is eccentrically connected to one side of a disk 241 mounted at an end of the main drive shaft 27. During each revolution of the main drive shaft, the pawl 229 will engage one tooth on the ratchet 203, and the design of the mechanism is such as to cause the pawl to rotate the ratchet through an angle covered by such tooth, to bring about feeding of the stapling heads associated therewith, following which, the pawl will be restored to its original position, ready to engage the next tooth. The entire sequence is timed by the angular position of the disk 241 to take place following the stapling operation period in each revolution of the main drive shaft. The feed control drive shaft 193 will, consequently, cause stapling wire to be fed during the final portion of a revolution of the main drive shaft, in as much as the actual operation of a stapling head is timed to take place during an intermediate portion of a revolution of the same shaft, it will be apparent that feeding or loading of the stapling heads will occur in preparation for the next stapling operation which will materialize during the next revolution of the main drive shaft.

The remaining stapling heads, or those which are intended to operate only when a longer dimension of a box is to be stapled, have their associated feed mechanisms driven from the shaft 235 on which the yoke 233 is journaled, and the angular movements of this shaft, which determine the feeding of stapling wire to these other stapling heads, are controlled by an independent pawl 243 and ratchet 245 under the control of a cam 247. The ratchet is mounted at one end of the shaft 235, adjacent the other prong 249 of the yoke 233, on an extension of which there is pivotally connected the pawl 243 for engagement with this ratchet 245. This pawl has affixed thereto, adjacent its claw end, a laterally extending pin 251 which is adapted to ride upon the surface of the cam 247, such cam being mounted on the hollow shaft 199 adjacent the outer surface of the bracket arm 195. The cam surface is provided with high and low sections 253 and 255 respectively, the high sections being sufficient to hold the pawl 243 out of engagement with its associated ratchet 245, while the low sections will permit such engagement. The ratchet is similar in design to that previously referred to, and the cam pattern is such that the low sections occur whenever it is desired to utilize the entire group of stapling heads in the sequence of operations entailed in the fabrication of a box. Thus, in the particular cam pattern illustrated, the entire assembly of stapling heads will operate on every third stroke of the machine, while during the two intermediate strokes, only those stapling heads associated with the feed control mechanisms operating off of the feed control drive shaft 193, will operate. Inasmuch as the cam pattern thus determines the sequence of grouping, it will be clear that any sequence may be obtained through proper design of this control cam.

The shaft 235, which determines operation of the additional feed control mechanisms 191, extends through the various brackets 134 to be supported thereby. Affixed to this shaft 235 adjacent one surface of a bracket which carries a feed control mechanism to be operated from the same shaft 235, is a gear 257 which meshes with a pinion 259 mounted on the feed control drive shaft 193. This pinion 259 has a lateral extension 261 passing through the bracket 134 to a point beyond. To this extended portion, there is keyed a feed wheel 263 having a knurled rim 265 and also having bolted thereto a gear 267. This feed wheel and associated gear mesh with a rim engaging roller 269 and associated pinion 271 in the same manner as has been described in connection with the first described feed control mechanism 189. The rim engaging roller 269 and associated pinion 271, like in the previously described mechanism, is mounted on an eccentric 273 under the control of a handle 275 which is also biased by a spring 277 to clamp the stapling wire between the feed wheel and associated roller.

In assembling the various components of a container for stapling, the operator follows a certain routine or sequence, and the machine, and more particularly the stapling heads and associated feed control mechanisms are set up to staple in group sequence in accordance with the routine followed by the operator. Under certain conditions, as when the operator may inadvertently depart from his customary routine, the machine and the operator will no longer be working in synchronism. To restore harmony between the routine of the operator and the sequential grouping of the stapling heads, the cam 247, instead of being permanently keyed to the hollow shaft 199, is mounted thereon in a manner which will permit manual shifting of the cam through a desired angle to restore the proper timing and thereby again bring about harmony between the operator and the machine. This is accomplished by notching the hollow shaft 199 with a plurality of V-notches 279 about its periphery at the location of the cam 247, and the cam is held in a fixed position, to the hollow shaft, by a spring pressed pin 281 supported radially therein and adapted to engage in any of the aforementioned notches 279. The spring pressed pin 281 is maintained under spring compression by a machine screw 283 threaded into the radial opening in which the pin is located.

To prevent the inertia of rotation of the various parts of the different feed mechanisms and associated apparatus from causing the same to overrun and feed an excess of wire to the stapling heads, which would result in the wire kinking and causing other feed troubles, a brake mechanism 285 is provided, which will assure sudden halting of movement of the feed mechanisms at the proper moment. This brake mechanism includes a brake drum 287 mounted on the feed control drive shaft 193, and a similar brake drum 289 mounted on the other feed control drive shaft 235. Each of these drums is formed with a peripheral groove 291 to receive a pair of brake lining sections 293 and 295. The sections 293 are attached to a brakeband component 297 covering corresponding portions of each drum on one peripheral side and including an intermediate connecting section 299. A similar brakeband component 301 supports the lining sections 295 on the other peripheral side of the drums and also includes an intermediate connecting section 303. The two brakeband components 297 and 301 are held in pressure engagement with the drums by a rod 305 extending through the intermediate connecting portions 299 and 303, with a compression spring 307 on its protruding end, to which end there is threaded a pair of adjusting nuts 309 for adjusting the compression of the spring and, consequently, the braking effect of the brake mechanism 285.

Across the front of the machine and intersecting the longitudinal axes of the stapling heads 71, is an anvil supporting bar 311, mounted as a cantilever beam, and rigidly anchored at one end in a bracket 313 supported on the flat bar connector 7.

The anchoring means includes a pair of spaced vertically depending anchor bars 315 and 317 bolted to the anchored end of the anvil supporting bar. Each of these anchor bars is adapted to slide within corresponding spaced openings in the bracket 313, under the control of a vertical adjusting screw 319 which threadedly extends upward through a bottom plate 321 closing the bottom end of the opening 315 in the bracket 313. The openings in the bracket are formed by bracket end members 325 and 327 complementarily fitting against a central bracket member 329 to which they are adjustably bolted, whereby, after proper vertical adjustment of the anvil supporting bar 311, the bracket members may be tightened into clamping engagement against the bars fitting therein, thereby anchoring the cantilever anvil supporting bar.

The anvil supporting bar is of substantially rectangular cross section, having that edge 331 which faces the stapling heads, beveled.

Lying parallel to the anvil supporting bar 311 and in close proximity to the beveled edge 331 thereof, is an anvil cam rod 333. This is journaled at one end in a rod mounting bracket 335, which bracket is clamped to the anvil supporting bar at the anchored end of this bar. The anvil cam rod is of a cross section, half of which is semi-circular in form, while the adjacent half forms a right angle and normally lies with the bisector of the right angle on a horizontal. A pinion sector 337 is fixed to this cam rod at a point adjacent the cam rod supporting bracket 335. This pinion sector is in engagement with a rack 339, such engagement being maintained by a back-stop or back-guide 341 attached or forming an integral part of the cam rod supporting bracket 335. The rack is located at the end of a rack arm 343 which is pivotally connected to a rocking arm 345, the other end of which is pivotally mounted on a stub shaft 347 extending from the outside surface of the upright frame member 5.

At an intermediate point on the rocking arm, there is provided a cam follower 349 which is adapted to ride upon the surface of a cam 351 fixed to a protruding end of the main drive shaft 27. During each revolution of the main drive shaft, the cam will also make a complete revolution, and its pattern is such as will cause rotation of the cam rod 333 through an angle of approximately 90°, and at angular velocities which are not linear, the reason being that the cam rod, as will be subsequently described, must effect the operation of certain anvil components in proper timing with the operation of associated stapling heads.

An anvil unit 353 is provided for each stapling head 71. Such unit is designed for mounting on the anvil supporting bar 311 in cooperative relationship with the anvil cam rod 333, and is located on the supporting bar 311 in alignment with the stapling head with which it is to be associated. To this end, the anvil unit 353 comprises a block 355 snugly fitting over the anvil supporting bar 311 and including a front section 357 facing the machine, and an upper horizontal portion 359 resting on the upper surface of the anvil supporting bar, and a lower horizontal portion 361 extending beneath and in contact with the lower surface of the anvil supporting bar. The block is clamped in proper location on the supporting bar by a clamping element 363 bolted to the end surface of the upper block sections 359 in engagement with the supporting bar, and a similar clamping element 365 bolted to the lower block section 361 in engagement with the supporting bar. The anvil block is provided with a circular opening 367 therethrough, in proper location to permit passage of the anvil cam rod 333 as the anvil block is mounted upon the anvil supporting bar. The upper section 359 and the front section 357 of the anvil block are provided with relatively deep slots 369 and 371 respectively, slightly spaced from the joining edge 373 of these two sections. The slots are sufficiently deep to intercept the cam rod opening 367 through the anvil block, and expose the cam rod passing therethrough.

An anvil element 375 is pivotally mounted at an intermediate point between the walls formed by the slot 369 in the upper section of the anvil block. It is adapted to rest at its active end 377 upon the cam rod 333, and is continually urged into contact against the cam rod by a spring 379 supported in a hole formed in the floor of the slot below the tail end 381 of the anvil element and bearing against such end of the element. The anvil element 375 has a flat upper surface 382, and its thickness is such that, with the cam rod in normal position, as when the machine is at rest, the flat upper surface 382 of the anvil element will lie practically flush with the upper surface of the anvil block, to either side of the slot 369 in which the anvil element is positioned.

A somewhat similar anvil element 383 is likewise mounted in the slot 371 formed in the front section of the cam block, and is also designed to provide a flat surface 385 substantially flush with the front surface of the anvil block, with the cam rod 333 in normal position. This anvil element 383 is also continually maintained with its active end 386 in contact with the cam rod by a compression spring 387 located with one end anchored in a hole in the floor of the slot 371, and its other end in pressure engagement against the tail end 389 of this anvil element.

As the cam rod 333 is rotated counter-clockwise from its rest position as indicated in Figure 9, it will become apparent that the anvil elements 375 and 383 will move inwardly in response to the springs 379 and 387, and approach each other until they reach the position depicted in Figure 10 after the cam had rotated through an angle of approximately 45°. Further rotation of the cam rod in the same direction through another 45° angle, will reverse movement of each of the anvil elements to a point slightly beyond their original positions as indicated in Figure 11. Following this, the anvil elements are restored to their rest positions. This sequence of operations of the anvil elements occurs in response to the operation of the cam controlled rack, and is timed in cooperation with the operation of the associated stapling heads. Such timing is clearly brought out in the comparative views, Figures 9, 10 and 11, in which the cam rod 333 is depicted as starting its angular movement after the stapling head has driven the legs of a staple part way through the walls of a container. At this instant, the anvil elements begin to withdraw in advance of the penetrating staple legs until the elements reach the end of their withdrawal movement. At this point, further penetration of the staple legs causes them to contact the anvil elements and bend inwardly slightly. Reverse movement of each of the anvil elements to a point slightly beyond its normal rest position follows such slight bending of the staple legs, and serves to clinch them securely against the inner surfaces of the box material. Inasmuch as the cam rod contacting surface which is presented to the anvil elements is not identical for both elements, one of the elements 383 has its cam rod engaging surface slightly modified to compensate for this, in order to realize simultaneous and similar movements of both anvil elements.

To secure a more powerful grip of the staple to the material of the box, it is found to be very desirable to clinch the staple leg at an angle to the plane of the staple, causing the staple leg to clinch across the grain of the box material. For this reason, I score the staple clinching surface of each anvil element with a plurality of angularly disposed grooves 390 which serve to guide the staple legs out of the plane of the staple during clinching, and across the grain of the material.

To realize the delayed operation of the anvil elements 375 and 383 until the staple head has arrived at the stage of its operation as indicated in Figure 9, the cam 351, which controls the cam rod operating rack 339, includes in its cam pattern a circular arc 391 extending about three-quarters of its periphery. The cam follower associated with this cam rides upon this circular arc portion of the cam surface during the greater portion of each revolution of the main drive shaft, thereby securing the proper timing between the anvil elements and the stapling heads.

To preclude overrunning of the cam rod control mechanism and assure prompt stopping of the main drive shaft at the completion of each revolution, following release of the foot treadle, a brake drum 392 is mounted on the main drive shaft adjacent the cam 351. It is engaged by a brakeband 393, one end of which is fixed about a stub shaft 394, while the other end is adjustably tensionable by a spring tensioned rod 395 passing through the stub shaft.

In assembling box components for stapling, one of the components 396 is placed upon the upper surface of each anvil 353, while a corner forming component 397 associated therewith is positioned against the surface of the front section of each anvil, and, while maintained in this position, the machine is set in operation to bring the stapling heads into engagement against these box components so assembled, and staple the same. The component 397 positioned against the surface of the front section of each anvil is the component which forms an end wall of the container. The component 396, which is first placed upon the upper surface of each anvil, constitutes one side wall of the container. After stapling the side component to the end component, they are withdrawn from the anvil, and the end component rotated through an angle of 90° and replaced with the end wall again in position against the surface of the front section of each anvil. This will bring the side wall 396 against the end of the anvil supporting bar 311. The bottom component 399 of the box may now be placed in position upon the upper surface of each anvil, and stapled to the adjacent edge of the end wall 397. Following this operation, the components thus far assembled may be removed and reversed to present the free ends of the side wall 396 and bottom 399 to the anvils. The other end wall component 401 is then placed vertically against the front surfaces of the anvils and the proper edge thereof stapled to the side wall component 396. Then with the end wall component 401 resting horizontally upon the upper surfaces of the anvils and the bottom in a vertical position against the front surfaces of the anvils, the bottom can then be stapled to the end wall 401. The second side wall 403 can then be stapled into position, by positioning it upright against the front surfaces of the anvils with the end wall 401 still resting on the upper surfaces of the anvil but rotated to present its proper edge to this side wall component. After stapling this end to the side wall 403, this side wall is placed upon the upper surfaces of the anvils with the other end wall 397 against the vertical surfaces of the anvils, and stapled thereto. In this manner the box is completed, and if it is found desirable to reinforce the bottom of the container by attaching the same to the side walls along the adjoining edges thereof, these may be stapled together upon a single head stapling machine.

Inasmuch as a single head stapling machine will invariably be required to fill in around the end walls of the container, whenever one of the stapling heads of my improved machine should fail to staple, as may occasionally happen when a spool of wire should run empty, the availability of the same will justify the use thereof for stapling the bottom to the side walls of the container, rather than complicate the manufacture and design of my improved stapling machine, for doing this particular work.

The stapling of the bottom to the side walls is not absolutely essential to considering the container complete, for preliminary to shipping packed containers, the covers are usually wirebound to the containers, and this may be relied on to give the bottom any added support, should it be found necessary.

By slightly modifying the design of my improved stapling machine, I am able to cooperate the operation of a modified machine with that of one unmodified, in further simplifying and facilitating the fabrication of containers, and with improved results. The modified machine is positioned so as to face the other machine, and represents a departure from the construction of the other in one respect by reversing the location of the anvil supporting bar bracket and the anvil cam rod control, so that corresponding elements of both machines will appear mounted on the same end of the two machine assembly. The modified machine further is provided with a slotted base 405 to which the side frame members of this machine are slidably bolted, so that the distance between the two machines may be adjusted to accommodate the assembly to the fabrication of boxes of different lengths.

The modified machine receives its power from the main drive shaft 27 of the first machine and, consequently, it is not necessary to provide this modified machine with a power shaft and belt connection to any prime mover, and such elements may be eliminated therefrom. The transfer of power from the main drive shaft of the first machine to that of the second machine is effected by means of an adjustable telescoping connection 407 extending between the two machines and terminating at each end in a mitered gear 409 which is maintained in engagement with a complementary mitered gear connected to the end of its associated drive shaft.

To facilitate the assembly of a container in a two machine assembly, I provide a work holder and gauge assembly 411 on each machine, the function of which is to hold an end wall component in proper position for stapling to the side and bottom components, and to automatically accommodate itself to the differing dimensions of this end wall, in accordance with the sequence of operations followed in assembling the components.

This work holder and gauge assembly comprises a frame 413 including an upper horizontal member 415, a lower horizontal member 417, and two upright side members 419. This frame spans the front of the machine, and is provided at each lower corner with a supporting plunger 421. Each plunger rests upon a spring 423 carried in a spring housing 425 forming part of a bracket 427 which is bolted to the front edge of each side frame member of the machine. The work holder frame extends upwardly to within a short distance of the work engaging position of the stapling heads, and is supported at its upper end by a plurality of bolts 429 fixed to the upper horizontal frame member 415 and slidably extending through the cross-member 7 of the machine. A compression spring 431 mounted on each of these bolts, between the frame member 415 and the cross-member 7, tends to urge the frame toward the anvils and thus cause the frame to clamp against any box end component which may be placed in position against the front sections of such anvils. Each side member 419 of the frame is provided with a lengthwise slot 433 to slidably receive a work supporting bracket 435 which extends between these sides of the frame, and is capable of vertical adjustment by means of bracket supporting bolts 436 which pass through the slots and can be tightened to preclude further movement of the bracket after the same has been adjusted to a desired elevation. This bracket is mounted on that surface of the frame facing the anvils, and lies in vertical alignment therewith.

On the opposing surface of the work holder frame are mounted a pair of brackets 437, each slidably adjustable in one of the slots 433. Pivotally mounted on these brackets is another work holder 439, of a length adapting it to rotate between the side members of the frame. This holder 439 is overbalanced to cause the same to normally drop between the side frame members to a position in vertical alignment with the anvils. When in such position, it presents a horizontal surface 441 for the support of a box end component during one of the operations of assembling.

The side members of the frame are calibrated, and associated with each end of the lower work holder is a gauge pointer or indicator 442 for cooperation with the calibrations to facilitate leveling off of the work holder, as well as to obtain proper positioning of the same for any particular job. A corresponding pointer or indicator 443 is mounted on each supporting bracket 437 and bent around the side frame member 419 to register with the scale thereon.

In employing a two unit machine assembly of the above character in the fabrication of boxes, a loose side wall component is laid across the lower supporting brackets 435, while an end wall is positioned in the work holder of each machine, to rest on this loose side component. The lower brackets 435 are adjusted to proper elevation, and a side wall is placed in position to rest upon the anvils of both machines. The foot treadle 55 is lowered to initiate operation of the machines simultaneously, causing opposing edges of the side wall to be simultaneously stapled to their adjacent end walls. Following this step, the end walls are rotated 90° for support by the upper work holders, and the bottom of the container is then laid across the anvils and stapled along opposing edges to the end walls. The other side wall is then stapled to the end walls in a third operation to finish the container, and then if it is found desirable to staple the side walls to the bottom, the stapling operations can be performed upon a single head stapling machine, as previously indicated.

The end of the upper work holder 439 facing the operator, is beveled. This causes the upper holder to automatically swing out of the way in response to insertion of an end wall, when the operation calls for use of the lower work holder.

The product resulting from the above operations is depicted in Figure 23. In connection with this figure, it will be noted that the staples at the "three wall" corners have been made to overlap and interlock, and this serves to strengthen the container considerably at these points. Such overlapping and interlocking of the staples is accomplished by the spacing of the stapling heads on the machine.

The corners of the container are tightly stapled, and the stapling is quite uniform, and such uniformity and tightness of joints may be attributed in large measure to the spring support of each work holder, which serves to accommodate the holder to slight variations in the dimensions of corresponding parts of different containers.

I have found that by utilizing stapling heads which will produce a rather large staple, the respective walls of the container are given considerable support and resiliency, more so than if smaller staples were used.

The use of stapling machines of the types described above, which staple a complete edge of a box at each stroke of a machine, enables the use of thin "shook" material in the fabrication of containers, and the resulting container is considerably stronger and will stand greater abuse than a wooden container of heavier material made by nailing the various components together. At the same time, inasmuch as nailing is eliminated, the end walls may be of the same thin material as the side walls and bottom. The container will accordingly have considerably less weight than a corresponding nailed container, placing it in a position to compete with containers of cardboard and the like, over which it possesses many advantages.

The machine is adapted to staple containers of varying wall thicknesses, even containers in which the end walls, for example, may be of different thickness than the side walls and bottom. The adjustable drive connections to the stapling heads provides for adjustments of the stapling heads along their 45° axes, and any single adjustment of this character will be sufficient to accommodate the machine to a container in which both the end and side walls and bottom are to be made of proportionately thicker or thinner material. Should one desire to assemble a container in which only the thickness of the sides and bottom are to be changed, the vertical adjusting screw 319 will permit adjustment of the machine for this purpose. Through combinations of both adjustments, the machine may be made to accommodate container components within a wide range of thicknesses.

While I have disclosed my invention in great detail, it will be apparent that the same may be modified without departing from the spirit of the invention, and I accordingly do not desire to be limited in my protection to the details of my disclosure, except as may be necessitated by the appended claims.

I claim:

1. A stapling machine assembly comprising a pair of oppositely disposed anvils spaced to be enclosed by three wall components of a contemplated container, wherein two of said wall components engage different edges of the third component to form a pair of interior angles of such container; each of said anvils having work engaging surfaces forming an angle whose bisector lies at an angle of the order of 45° with the horizontal; and a pair of stapling heads, each directed toward the position to be occupied by one of said edges of said third component substantially in line with the bisector of its associated anvil angle bisector.

2. A stapling machine comprising a plurality of stapling heads; and means for controlling the stapling ability of said stapling heads in accordance with a predetermined sequential grouping; said means including a plurality of stapling head feed assemblies, each associated with a stapling head to feed stapling material thereto when actuated, a stapling head feed drive shaft in driving connection with certain of said stapling head feed assemblies, another stapling head feed drive shaft in driving connection with others of said stapling head feed assemblies, a main drive shaft, a driving connection between said main drive shaft and each of said feed drive shafts, each of said connections operating through a pawl and ratchet, and a cam associated with one of said pawls to hold the same out of engagement with its ratchet for intervals of operation of said other pawl and ratchet to obtain said predetermined sequential grouping.

3. In a machine designed to perform a predetermined sequence of operations, a cam for controlling said sequence of operations, a shaft having a plurality of longitudinal grooves about its periphery, said cam being rotatably mounted on said shaft and having a spring pressed pin radially thereof adapted to engage one of said grooves at a time to fix said cam against rotation on said shaft in any of the plurality of possible positions of said cam as determined by said grooves, to alter the timing of said sequence of operations.

4. In a stapling machine, an anvil having work engaging surfaces defining an angle, a stapling head disposed for cooperation with both work-engaging surfaces of said anvil, means for adjusting the stapling position of said stapling head simultaneously with respect to said work engaging surfaces, and means for adjusting said anvil in a direction to alter the distance between said stapling head and one only of said work engaging surfaces as measured normal to said surfaces.

5. In a stapling machine, an anvil having work engaging surfaces defining a 90° angle, one of said work engaging surfaces being horizontal, a stapling head disposed with its longitudinal axis in substantial alignment with the 45° bisector of said angle, means for adjusting the stapling position of said stapling head along said longitudinal axis, and means for adjusting said anvil in a direction normal to said horizontal work engaging surface.

6. In a stapling machine, an anvil having work engaging surfaces defining an angle, a stapling head disposed with its longitudinal axis in substantial alignment with the bisector of said angle, means for adjusting the stapling position of said stapling head along said longitudinal axis, and means for adjusting said anvil in a plane parallel to the plane of one of said work engaging surfaces.

7. In a stapling machine for the stapling of box corners, a stapling head adapted during operation thereof, to drive the legs of a staple through the corner forming components to be stapled, a cooperating anvil comprising an anvil block having angularly disposed work engaging surfaces, a rotatable cam in said block within the angle defined by said work engaging surfaces, a pair of slots in said block, each through a work engaging surface and of sufficient depth to expose said rotatable cam, a staple engaging anvil element pivotally mounted in each slot, spring means urging said anvil elements against the cam surface of said cam, said cam having a cam surface which in the normal position of said cam maintains said anvil elements substantially flush with the work engaging surfaces and which during rotation causes said elements to withdraw into said slots below the work engaging surfaces and subsequently return toward their initial positions, and means for coordinating the cam movement of said anvil cam with said stapling head to cause said anvil elements to give way before the approaching staple legs during penetration thereof through said corner forming components and subsequently clinch said staple legs against the surfaces of said corner forming components.

8. In a stapling machine for the stapling of box corners, a stapling head adapted during operation thereof, to drive the legs of a staple through the corner forming components to be stapled, a cooperating anvil comprising an anvil block having angularly disposed work engaging surfaces, a rotatable cam in said block within the angle defined by said work engaging surfaces, a slot in said block through each work engaging surface and of sufficient depth to expose said rotatable cam, a staple engaging anvil element pivotally mounted in each slot, spring means urging said anvil elements against the cam surface of said cam, said cam having a cam surface which in the normal position of said cam maintains said anvil elements substantially flush with the work engaging surfaces and which during rotation causes said elements to withdraw into said slots below the work engaging surfaces and subsequently return them to their initial positions, and means for coordinating the cam movement of said anvil cam with said stapling head to cause said anvil elements to give way before the approaching staple legs during penetration thereof through said corner forming components and subsequently clinch said staple legs against the surfaces of said corner forming components, said coordinating means including a common drive shaft, a cam control rack operated from said drive shaft and controlling the rotational movement of said anvil cam, and a cam controlled connection also operated from said drive shaft and controlling the operation of said stapling head.

9. A stapling machine adapted for the stapling of box components, comprising an anvil having a vertically disposed work engaging surface against which one component of a contemplated box is to be positioned and rotated to other positions in accordance with a predetermined sequence of assembling other box components thereto, a plurality of work supporting gauges, each when in operation being capable of properly supporting said one component in one of said rotated positions against said anvil for the stapling of another box component thereto, and means for enabling said gauges to be placed in operation in accordance with the predetermined sequential rotative positioning of said one box component when assembling the other components thereto.

10. A stapling machine adapted for the stapling of box components, comprising an anvil having a work engaging surface against which one component of a contemplated box is to be positioned and rotated to other positions in accordance with a predetermined sequence of assembling other box components thereto, a work supporting gauge capable of properly supporting said one component in one of said rotative positions against said anvil for the stapling of another box component thereto, a second work supporting gauge, means normally urging said second work supporting gauge against said one component to cause said second supporting gauge to move into operating position upon removal of said one component preparatory to rotating the same to another position.

11. A stapling machine adapted for the stapling of box components, comprising an anvil having a work engaging surface against which one component of a contemplated box is to be positioned and rotated to other positions in accordance with a predetermined sequence of assembling other box components thereto, a work supporting gauge capable of properly supporting said one component in one of said positions against said anvil for the stapling of another box component thereto, said work supporting gauge being resiliently mounted to compensate for dimensional variations between similar components of different boxes, a second work supporting gauge hingedly secured to said resilient mounting and counterweighted to urge the same toward operating position, said second work supporting gauge being held out of supporting position by said one box component when supported by said first work supporting gauge.

12. A stapling machine adapted for the stapling of box components, comprising an anvil having a work engaging surface against which one component of a contemplated box is to be positioned and rotated to other positions in accordance with a predetermined sequence of assembling other box components thereto, a work supporting gauge capable of properly supporting said one component in one of said positions against said anvil for the stapling of another box component thereto, said work supporting gauge being resiliently mounted to compensate for dimensional variations between similar components of different boxes, a second work supporting gauge secured to said resilient mounting and held out of operating position by said one component when supported by said first work supporting gauge, means for adjusting the mounting position of each gauge on said resilient mounting, and indicating means for indicating such position adjustments.

13. In a stapling machine, an anvil having work engaging surfaces disposed at an angle to one another for angular positioning of box components in the formation of a box corner, a stapling head positioned for operation against said box components in the driving of a corner staple therethrough, and means for resiliently supporting at least one of said box components to permit the joining edge of said component to align itself with the adjacent edge of said other component during stapling.

14. In a stapling machine, an anvil having work engaging surfaces disposed at an angle to one another for angular positioning of box components in the formation of a box corner, a stapling head positioned for operation against said box components in the driving of a corner staple therethrough and including means for aligning up the joining edges of said components preliminary to the stapling operation, and means for resiliently supporting at least one of said box components to permit the joining edge of said component to align itself with the adjacent edge of said other component in response to the aligning means of said stapling head.

15. In a stapling machine, a stapling head, an anvil supported in spaced relationship to said stapling head and adapted to support work to be stapled, a support for the work engaging end of said stapling head, a separate support for the other end of said stapling head, both said supports cooperating to hold said stapling head on an angle of approximately 45° with the horizontal, means for urging said first support toward said anvil sufficient only to bring said work engaging end of said stapling head into engagement with such work, and means for simultaneously urging said second support in the same direction but for a greater distance sufficient to cause stapling operation of said stapling head following engagement of said stapling head with said work.

MANUEL S. LOPES, Jr.